US012301758B1

United States Patent
Rao et al.

(10) Patent No.: US 12,301,758 B1
(45) Date of Patent: May 13, 2025

(54) CONTEXT DATA ATTACHMENT FOR INTERFACE-BASED COMMUNICATION SESSIONS

(71) Applicant: Amazon Technologies, Inc., Seattle, WA (US)

(72) Inventors: Siddhartha Shankara Rao, Seattle, WA (US); Giridhar Kalpathy Narayanan, Sammamish, WA (US); Ryan Steven McHarg, Seattle, WA (US); Abitha Padmanabhan, Cupertino, CA (US); Curtis Gill Hartmann, Kensington, MD (US); John Joseph Dunne, Bremertom, WA (US)

(73) Assignee: Amazon Technologies, Inc., Seattle, WA (US)

( * ) Notice: Subject to any disclaimer, the term of this patent is extended or adjusted under 35 U.S.C. 154(b) by 215 days.

(21) Appl. No.: 18/067,381

(22) Filed: Dec. 16, 2022

(51) Int. Cl.
  *H04M 3/51* (2006.01)
  *G06Q 30/015* (2023.01)
  *H04M 3/523* (2006.01)

(52) U.S. Cl.
  CPC ........ *H04M 3/5183* (2013.01); *G06Q 30/015* (2023.01); *H04M 3/5235* (2013.01)

(58) Field of Classification Search
  None
  See application file for complete search history.

(56) References Cited

U.S. PATENT DOCUMENTS

| | | | |
|---|---|---|---|
| 2006/0098624 A1 | 5/2006 | Morgan et al. | |
| 2007/0201675 A1* | 8/2007 | Nourbakhsh | H04M 3/5133 |
| | | | 379/265.01 |
| 2009/0235329 A1 | 9/2009 | Chavez et al. | |
| 2012/0072440 A1 | 3/2012 | Vasquez et al. | |
| 2019/0372824 A1 | 12/2019 | Montero et al. | |
| 2020/0304547 A1 | 9/2020 | Lu et al. | |
| 2020/0329144 A1 | 10/2020 | Morgan et al. | |
| 2020/0366868 A1 | 11/2020 | Liang et al. | |
| 2022/0385704 A1 | 12/2022 | Eftekhari et al. | |
| 2023/0143579 A1 | 5/2023 | Asgekar et al. | |

* cited by examiner

*Primary Examiner* — Harry S Hong
(74) *Attorney, Agent, or Firm* — BakerHostetler

(57) ABSTRACT

Context data may be received corresponding to a first communication session that includes a first user and a second user that joins the first communication session on behalf of a customer account. The context data may be provided to the first user and the second user. The context data may be stored in a searchable data storage that stores a communication session context history for the customer account. Search requests may be received, from the customer account, for searching the communication session context history. Responses may be provided based at least part on the context data. The context data may include second session information for joining a second communication session between the first user and the second user. Requests to join the second communication session may be received based on the second session information, and the second communication session may be established between the first user and the second user.

20 Claims, 8 Drawing Sheets

| Context Data Selection Interface 200 | |
|---|---|
| 201 ☐ | User Identity Information |
| 202 ☒ | User Location |
| 203 ☒ | Prior Voice Commands |
| 204 ☒ | Current Page Identifier (e.g., URL) |
| 205 ☒ | Previous Page Identifiers / Browsing History |
| 206 ☒ | Page Screenshots |
| 207 ☒ | Page Entered Information |
| 208 ☒ | User Device Information (e.g., OS, architecture, etc.) |
| 209 ☒ | Photographs / Documents |
| 210 ☒ | Video Session Information (e.g., URL) |
| 211 ☒ | Session Timing Information (e.g., Date, Time, Duration, etc.) |
| 212 ☒ | Agent Information (e.g., Name, Call Center, etc.) |
| 213 ☒ | Called Phone Number |
| 214 ☒ | Custom Context Data |

FIG. 2

610 Receive first session information associated with establishing a first communication session that includes a first user and a second user, wherein the second user joins the first communication session on behalf of a customer account, wherein the first communication session provides a first communication medium (e.g., audio communication, messaging)

612 Provide, to at least one of the first user or the second user, via the first communication session, second session information for joining a second communication session, wherein the second communication session provides a second communication medium (e.g., video communication) that is not provided by the first communication session

614 Receive, based on the second session information, one or more requests to join the second communication session

616 Establish the second communication session

FIG. 6

CONTEXT DATA ATTACHMENT FOR INTERFACE-BASED COMMUNICATION SESSIONS

CROSS-REFERENCE TO RELATED APPLICATIONS

This application is related to the following application, which is hereby incorporated by reference in its entirety: U.S. patent application Ser. No. 18/067,361 filed Dec. 16, 2022, entitled "COMMUNICATION ESCALATION FOR A COMMUNICATION SESSION".

BACKGROUND

Users may often initiate communication sessions (e.g., phone calls, chat sessions, etc.) as a way to obtain additional information associated with their activity in one or more applications. In one specific example, a user working in an insurance application provided by an insurance company may have questions about how to fill out an online insurance form. The user may then attempt to call the insurance company for assistance regarding these questions. One example problem related to these, and other, types of phone calls is that the party receiving the call (e.g., an insurance agent) may have only very limited information about the context of the call. For example, the insurance agent may not know which form the user is working on, may be unable to view the information the user has already entered into the form, and may also be unable to view which portion of the form the user is currently working on. While the user may attempt to describe these details to the insurance agent, this may lead to confusion and inaccuracy and may also add additional time to the length of the call.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 2 is a diagram illustrating an example context data selection interface that may be used in accordance with the present disclosure.

FIG. 6 is a flowchart illustrating an example communication escalation process that may be used in accordance with the present disclosure.

DETAILED DESCRIPTION

Figure 1:
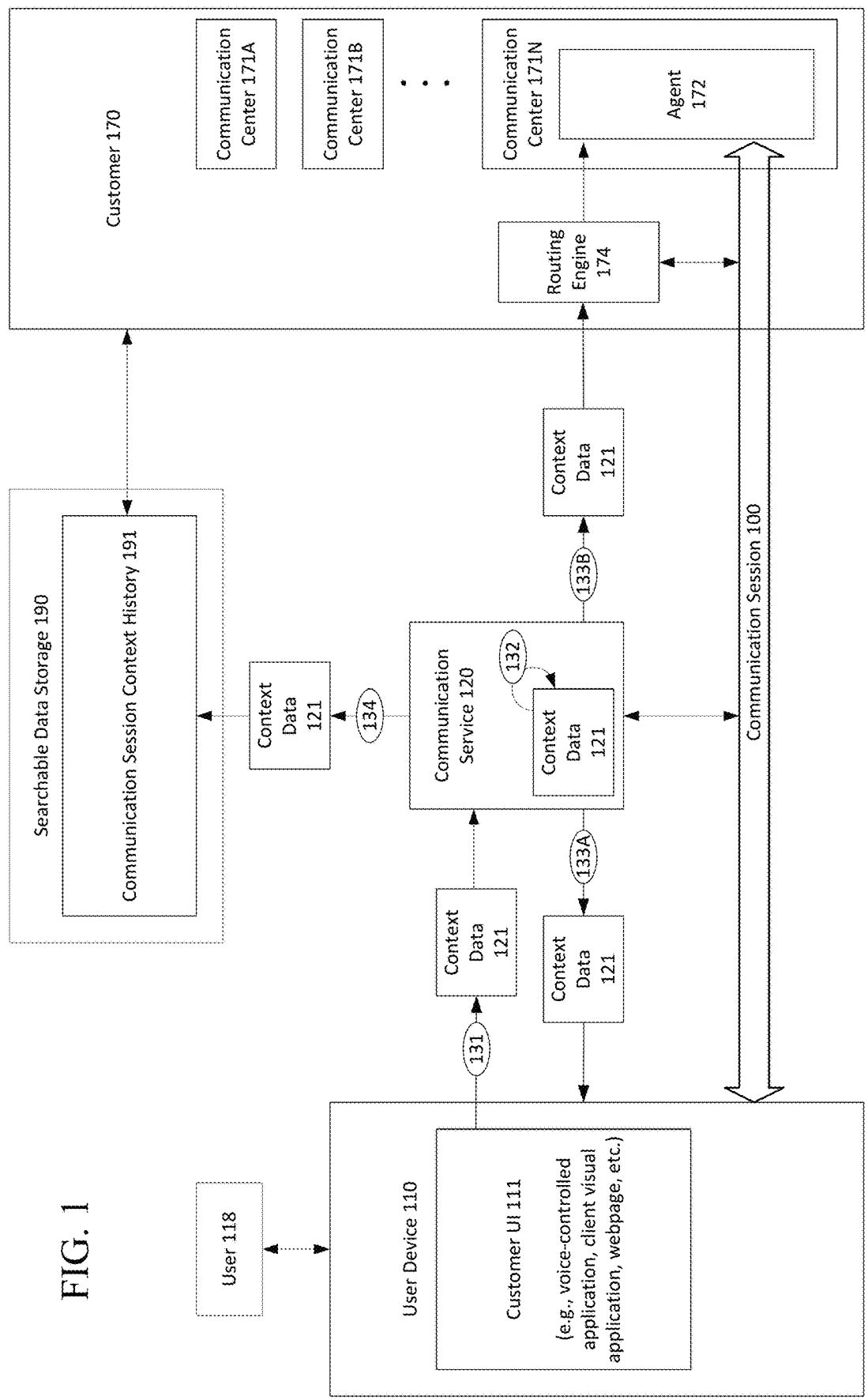
FIG. 1 is a diagram illustrating an example communication session context data attachment system that may be used in accordance with the present disclosure.

Techniques for context data attachment for interface-based communication sessions are described herein. In some examples, a communication service may provide communication session context data support services to customers, such as companies that receive large quantities of calls and other communications (e.g., insurance companies, accounting companies, medical companies, transportation and travel companies, online merchants, and many others). As part of these services, a customer user interface (UI) (e.g., voice-controlled application, client visual application, webpage, etc.) may allow a user to initiate communication sessions (e.g., audio, video and/or messaging sessions) with the customer directly from within the customer UI. As one specific example, a user working in an insurance application provided by an insurance company may have questions about how to fill out an online insurance form. The user may then attempt to call insurance company for assistance regarding these questions. For example, for a visual customer UI, the customer UI may display a selectable button or control that may be labeled with words such as, "click this button to call my insurance agent." As another example, for a voice-controlled customer UI, the user may provide a voice command such as, "voice assistant: ask my insurance company to call my insurance agent."

In some examples, the customer UI may collect context data corresponding to a communication session that is initiated from within the customer UI. The customer UI may then provide this context data to the communication service in association with the initiation of the communication session. In some examples, the context data may include information regarding user activity within the customer UI prior to requesting of the communication session. For example, the user activity information may include an indication (e.g., screenshot, uniform resource locator (URL) or other page identifier, etc.) of a page that the user is currently viewing, indications of one or more prior pages that were previously displayed to the user, indications of information entered by the user into the current and/or prior displayed pages, indications of one or more of the most recent voice commands and/or other voice input provided by the user, indications of user communications (e.g., chat messages) with a bot, and the like. Additionally, in some examples, the context data may include the date and time at which the communication session is requested, a called and/or messaged address or telephone number, as well as location information for the user, such as based on global positioning system (GPS) coordinates of the user's device. Furthermore, in some examples, the context data may include identity information for the user, such as may be obtained from a user account to which the user may log-in to and be authenticated when accessing the customer UI. This identity information may include the user's username, age, and other information. In some examples, the user identity information and/or other context data may be included only to subject to user approval. The context data may also include device information regarding a user device used to initiate the communication session, such as an operating system, architecture, and other information about the device. The context data may also include photographs, such as the most recent photographs captured by the user device or other photographs that may be attached, or otherwise indicated, by the user. The context data may also include a wide variety of custom information (e.g., information about products in a virtual shopping cart, etc.), such as may be defined and requested by the customer and/or the user. In some examples, communication service may provide a selectable list of pre-defined types of context data, from which the user and/or the customer may select types of context data which the user and/or customer would like to be included (or not included) in the context data that is collected in association with the user's communication session. Also, in some examples, all, or any part, of the context data may include open standard file format data, such as JavaScript Object Notation (JSON) data and/or any other suitable types of data or formats.

In some examples, the communication service may assist in routing the communication session from the user's device to a recipient (e.g., an agent in a customer call center). The context data that is collected in association with the communication session may be provided to the communication service. Additionally, the communication service may itself optionally obtain and add context data that may also be associated with the communication session. The communication service may then provide the context data to any, or all, of the participants in the communication session. In some examples, the context data may be delivered to the communication session participants via a header of a communications protocol used to implement the communication session, such as a session initiation protocol (SIP) header.

In some examples, the context data may be used to make intelligent decisions regarding routing of the communication session. Thus, the communication session may be routed to a second user (e.g., a call center agent) based at least in part on the context data. For example, for the scenario in which a user is calling a customer that operates several different call centers, the context data may be used to determine to which of the different call centers the incoming call should be routed. In one specific example, a tax assistance company may operate a first call center that specializes in federal taxes and a second call center that specializes in state taxes. In some cases, the context data may indicate whether a user is working on a federal tax form or a state tax form, and this context may be used to intelligently route the incoming call to the first call center or the second call center (and/or to a specific agent within the first or the second call center).

Additionally, the context data may also be used by a communication session participant to quickly and efficiently obtain context regarding the communication session, which may help to target and focus the subject of the communication session, improve the accuracy, reliability and security of information exchanged during the communication session, and also shorten the length of the communication session. In one specific example, a user may call a customer because the user is having difficulty filling out an online form, and the context data may include an indication (e.g., screenshot, URL or other identifier) of a page that includes the online form. The called party agent may use this information to quickly and efficiently determine the online form that the user is currently working on, to determine the user's current progress, to determine a specific portion of the form with which the user may need assistance, and to provide targeted information for assisting the user, such as based on information that the user has already entered into other parts of the form. In another specific example, a user's prior voice commands and other voice input data may be used to provide context for the call. For example, prior to requesting a call, a user may issue voice commands to attempt to obtain information about doctors in his or her area. Based on these questions, a called party agent, such as a medical insurance company agent, may determine that the user is attempting to obtain information about in-network doctors in the user's area, and potentially a specific type of doctor that the user has asked about (e.g., psychologist, optometrist, dentist, etc.). As yet another specific example, a user that has just been involved in a car accident may call his or her auto insurance company for advice about making an insurance claim. The user may take photographs of the accident scene, for example that show damage to the user's car and other cars or surrounding property. These photographs may be provided as part of the context data, and the called party agent may view these photographs to immediately determine the nature of the accident, the damage to cars and property, the make and model of the cars involved, details of the location and accident scene, and the like.

In some examples, the communication service may provide, within the context data for a first communication session, second session information (e.g., a URL or other join link, meeting identifier (ID), etc.) for launching a second communication session between the user and the agent. At some point during the first communication session, this second session information may be used (e.g., via selection of a join link, etc.) by the user and/or the agent to launch a second communication session between the user and the agent (and/or another user of behalf of the customer). The first communication session may provide a first communication medium (e.g., a phone call or other audio communication, chat, etc.), and the second communication session may provide a second communication medium (e.g., video communication) that is not provided by the first communication session. In one specific example, the first communication session may be a phone call, and the second communication session may be a video communication session. Thus, in some examples, during a first communication session that is a phone call, the call participants may choose to escalate the call to a second communication session that includes video. Additionally, the launched second communication session may provide a variety of content sharing features, such as screen sharing. In some examples, this may allow an agent to further assist a user in online or other activities, such as filling out an online tax or insurance form and many other types of activities. The second session information can also be optionally texted to the telephone number associated with the user and/or agent. The parties are then able to join a meeting that includes the user device's audio session, the agent's audio, and video (e.g., screen share, etc.) content coming from the user and/or the agent. In some examples, the second session information may be encoded into an audio stream that is delivered to the user and/or the agent. For example, in some cases, the second session information may be encoded by being mapped to audio-frequency data that is inserted into a call, such as different sound characteristics (e.g., amplitude, duration) at various frequencies that are used to represent the second session information. This may allow the second session information to be delivered via traditional audio calling platforms that are not SIP-based or Internet-based. Additionally, in some examples, the second session information may be encrypted (e.g., via a public/private key encryption scheme) with end-to-end encryption between the calling device and agent, ensuring that nobody other than the user or the agent (and/or another user of behalf of the customer) can join the second communication session and present content.

In some examples, the communication service may provide a searchable data storage that stores a communication session context history for the customer account. For example, the searchable data storage may include context data for any, or all, phone calls that are received by a customer account over a given time period. In addition to context data, the communication service may also generate a transcript of each communication session, which may be stored in the searchable data storage in association with the context data. Furthermore, the communication service may also determine topic data (e.g., topic keywords spoken during a call) for each communication session based at least in part on the transcript and/or the context data. The topic data corresponding to each communication session may also be stored in the searchable data storage in association with the context data. The customer may then issue queries and other searches on the searchable data storage, such as to determine common problems that cause users to contact the customer, to determine characteristics of these problems based on context (e.g., user location, device information, customer UI type information, etc.), to help resolve these and problems, and for many other reasons. In some examples, the searchable data storage may be searched using natural language search techniques. For example, a customer may submit queries such as, "tell me the top topics for callers in Arizona who are calling after getting stuck on our billing page." The searchable data storage may then be searched to generate a report in response to these and other search requests.

FIG. 1 is a diagram illustrating an example communication session context data attachment system that may be used in accordance with the present disclosure. In the example of FIG. 1, communication service 120 may provide communication session context data support services to customer 170. In this example, customer 170 operates communication centers 171A-N. In some examples, communication centers 171A-N may be call centers. Also, in addition or as an alternative to phone calls, communication centers 171A-N may include agents that perform other types of communications (e.g., chat and other types of messaging, video communications, etc.). Also, in some examples, the customer 170 may operate one or more bots that may communicate with users. Each communication center 171A-N may include any number of respective agents (including agent 172 in communication center 172N) that answer, join, and participate in, communication sessions. Some examples of companies that commonly operate communication centers 171A-N may include insurance companies, accounting companies, medical companies, transportation and travel companies, online merchants, and many others. It is noted, however, that there is no requirement that customer 170 must operate multiple different communication centers. In some examples, customer 170 may have any number of agents that answer calls on its behalf—and in some cases even only a single agent.

As shown in FIG. 1, customer 170 may provide a customer user interface (UI) 111 that executes on a user device 110. In some examples, customer UI 111 may be a voice-controlled application, a client visual application, a webpage, or another type of interface. The customer UI 111 may allow a user 118 to initiate a communication session 100 with the customer 170 directly from within the customer UI 111. The communication session 100 may include communication via one or more of a variety of different communication mediums, such as audio communication (e.g., phone calls), messaging (e.g., chat messaging), and/or video communication. As one specific example, user 118 may be working in an insurance application provided by an insurance company may have questions about how to fill out an online insurance form. The user 118 may then attempt to call insurance company for assistance regarding these questions. For example, for a customer UI 111 that is a visual interface (e.g., a client application or webpage), the customer UI 111 may display a selectable button or control that may be labeled with words such as, "click this button to call my insurance agent." As another example, for a customer UI 111 that is a voice-controlled interface, the user 118 may provide a voice command such as, "voice assistant: ask my insurance company to call my insurance agent."

The customer UI 111 may collect context data 121 corresponding to a request for a communication session 100 that is initiated from within the customer UI 111. In some examples, the context data 121 may be collected and updated by the customer UI 111 at fixed time intervals and/or in response to various actions (e.g., loading a new page, receipt of user input data, in response to the user 118 requesting a call, etc.). In some examples, the context data 121 may include information regarding user activity within the customer UI 111 prior to requesting of the communication session 100. For example, the user activity information may include an indication (e.g., screenshot, uniform resource locator (URL) or other page identifier, etc.) of a page that the user 118 is currently viewing, indications of one or more prior pages that were previously displayed to the user 118, indications of information entered by the user 118 into the current and/or prior displayed pages, indications of one or more of the most recent voice commands and/or other voice input provided by the user 118, and the like.

Additionally, in some examples, the context data 121 may include the date and time at which the communication session 100 is requested, the called telephone number, as well as location information for the user 118, such as based on global positioning system (GPS) coordinates of the user device 110. Furthermore, in some examples, the context data 121 may include identity information for the user 118, such as may be obtained from a user account to which the user may log-in to and be authenticated when accessing the customer UI 111. This identity information may include the user's username, age, and other information. In some examples, the user identity information and/or other portions of context data 121 may be included only to subject to user approval. The context data 121 may also include device information regarding a user device used to initiate the communication session 100, such as an operating system, architecture, and other information about the device. The context data 121 may also include photographs, such as the most recent photographs captured by the user device 110 or other photographs that may be attached, or otherwise indicated, by the user 118. The context data 121 may also include a wide variety of custom information (e.g., information about products in a virtual shopping cart, etc.), such as may be defined and requested by the customer 170 and/or the user 118. Also, in some examples, all, or any part, of the context data 121 may include open standard file format data, such as JavaScript Object Notation (JSON) data and/or any other suitable types of data or formats. Additionally, in some examples, the context data 121 may include user communications (e.g., chat messages) with a bot that may be operated by, or on behalf of, the customer 170. Thus, it is noted that the context data 121 may be collected by the customer UI 111 and/or a variety of other components, including bots and other data gathering tools.

As shown in FIG. 1, at act 131, the customer UI 111 (and/or other data gathering tools) may provide the context data 121 to the communication service 120 in association with a communication session request from user 118. Additionally, at act 132, the communication service 120 may update the context data 121, such as by optionally adding additional information to the context data 121, removing information from the context data 121, or otherwise modifying the context data 121. For example, for scenarios in which video escalation is enabled, the communication service 120 may add second session information (e.g., a video join link) into the context data 121. In other examples, the communication service 120 may remove information from the context data 121, such as information that user 118 and/or customer 170 does not wish to have included in the context data 121 (e.g., based on information entered into context data selection interface 200 that is described in detail below with reference to FIG. 2). The communication service 120 may then provide the context data 121 (including any additional information added by the communication service 120) to both the customer 170 as well as the user 118. Specifically, at act 133A, the communication service 120 may provide the context data 121 to the user device 110 (and/or optionally other devices operated by the user 118). Additionally, at act 133B, the communication service 120 may provide the context data 121 to the customer 170. In some examples, the communication service 120 may route the communication session 100 from the user device 110 to the customer 170. For example, a first leg of the communication session 100 may be placed from the user device to the communication service 120, and a second leg of the communication session 100 may be placed from the communication service 120 to the customer 170. In some examples, the communication service 120 may include multiple underlying services or subservices, such as for handling context data, for call and other communication routing, and the like. In some examples, the context data 121 may be delivered to the customer 170 and/or the user 118 via a header of a communications protocol used to implement the communication session 100, such as an SIP header.

In some examples, the communication service 120 may assist in routing the communication session 100 from the user device 110 to the customer 170. In the example of FIG. 1, the customer 170 has a routing engine 174 that may route communication session 100 to a specific one of communication centers 171A-N and/or to a specific agent within one of communication centers 171A-N. In the example of FIG. 1, routing engine 174 determines to route communication session 100 to agent 172 in communication center 171N. In the example of FIG. 1, the context data 121 is provided to routing engine 174, which uses the context data 121 to make intelligent decisions regarding routing of the communication session 100. For example, the routing engine 174 may use the context data 121 to determine to which of the communication centers 171A-N the communication session 100 should be routed. In one specific example, a tax assistance company may operate a first call center that specializes in federal taxes and a second call center that specializes in state taxes. In some cases, the context data 121 may indicate whether a user 118 is working on a federal tax form or a state tax form, and this context data 121 may be used to intelligently route the communication session 100 to the first call center or the second call center (and/or to a specific agent within the first or second call center).

The context data 121 may also be provided to the agent 172 that participates in the communication session 100. The context data 121 may be used by the agent 172 to quickly and efficiently obtain context regarding the communication session 100, which may help to target and focus the subject of the communication session 100, improve the accuracy, reliability and security of information exchanged during the communication session 100, and also shorten the length of the communication session 100 (and reduce the need for follow-up phone calls). In one specific example, user 118 may call customer 170 because the user 118 is having difficulty filling out an online form, and the context data 121 may include an indication (e.g., screenshot, URL or other identifier) of a page that includes the online form. The agent 172 may use this information to quickly and efficiently determine the online form that the user 118 is currently working on, to determine the user's current progress, to determine a specific portion of the form with which the user 118 may need assistance, and to provide targeted information for assisting the user 118, such as based on information that the user 118 has already entered into other parts of the form. In another specific example, the user's prior voice commands and other voice input data may be used to provide context for the phone call. For example, prior to requesting the phone call, the user 118 may issue voice commands to attempt to obtain information about doctors in his or her area. Based on these questions, the agent 172, such as a medical insurance company agent, may determine that the user 118 is attempting to obtain information about in-network doctors in the user's area, and potentially a specific type of doctor that the user 118 has asked about (e.g., psychologist, optometrist, dentist, etc.). As yet another specific example, a user 118 that has just been involved in a car accident may call his or her auto insurance company for advice about making an insurance claim. The user 118 may take photographs of the accident scene, for example that show damage to the user's car and other cars or surrounding property. These photographs may be provided as part of the context data 121, and the agent 172 may view these photographs to immediately determine the nature of the accident, the damage to cars and property, the make and model of the cars involved, details of the location and accident scene, and the like.

In some examples, communication service 120 may provide a selectable list of pre-defined types of context data 121, from which the user 118 and/or the customer 170 may select types of context data 121 which the user 118 and/or customer 170 would like to be included (or not included) in the context data 121 that is collected in association with the communication session 100 (and other communication sessions). Referring now to FIG. 2, an example of a context data selection interface 200 will now be described in detail. The context data selection interface 200 may be provided, by the communication service 120, to the customer 170 and/or the user 118. For example, the customer 170 may use the context data selection interface 200 to indicate types of context data 121 that the customer 170 would like to have collected for incoming communication sessions (including communication session 100) directed to the customer 170. Additionally, the user 118 may use the context data selection interface 200 to indicate types of context data 121 that the user 118 would like to have collected for communication sessions (including communication session 100) initiated by the user 118 from within the customer UI 111 (and potentially other applications).

In the example of FIG. 2, the context data selection interface 200 includes checkboxes 201-214, which each correspond to a respective context data type. Specifically, checkbox 201 corresponds to user identity information, checkbox 202 corresponds to the user's location (e.g., based on GPS coordinates of the user device 110), checkbox 203 corresponds to prior voice commands that may be issued by user 118 to a customer UI 111 that is voice-controlled, checkbox 204 corresponds a current page identifier (e.g., URL) for a page that the user 118 is currently working on when requesting communication session 100, checkbox 205 corresponds to page identifiers (e.g., URLs) of pages that the user 118 was working on prior to requesting the communication session 100 (e.g., indicated using a browsing history), checkbox 206 to screenshots of pages that the user 118 is currently working on (and/or previously worked on), checkbox 207 corresponds to information entered into input fields on a page that the user 118 is currently working on (and/or previously worked on), checkbox 208 corresponds to information about user device 110 (e.g., operating system, architecture, etc.), checkbox 209 corresponds to photographs (or other documents) captured by and/or saved on user device 110, checkbox 210 corresponds to second session information (e.g., a URL or other link for launching a video or other type of second communication session) in association with communication session 100, checkbox 211 corresponds to communication session timing information (e.g., a date, time and duration of the communication session 100), checkbox 212 corresponds to agent information (e.g., a name of the agent 172 that joins the communication session 100 and an indication of the communication center 171N of the agent 172), checkbox 213 corresponds to the called phone number, and checkbox 214 corresponds to custom context data that may be defined by the customer 170, the user 118 and/or another party. In some examples, the selection of checkbox 214 may trigger loading of another interface that allows the custom context data to be further specified and defined. It is noted that the types of context data 121 listed in FIG. 2 are merely examples and that other types of context data 121 may be used in accordance with the described techniques.

In the example of FIG. 2, the selection (e.g., checking) of any of checkboxes 201-214 may cause the corresponding context data type to be collected and stored in association with the communication session 100 (and other communication sessions associated with user 118 and/or customer 170). By contrast, not selected or de-selecting (e.g., unchecking) any of checkboxes 201-214 may cause the corresponding context data type to not be collected or stored in association with the communication session 100 (and other communication sessions associated with user 118 and/or customer 170). In the specific example of FIG. 2, checkboxes 202-214 have all been selected (e.g., checked), thereby causing their corresponding context data types to be collected and stored. By contrast, checkbox 201 has not been selected (e.g., is not checked), thereby causing its corresponding context data type (user identity information) to not be collected or stored. In some examples, such as for privacy purposes, not collecting or storing user identity information may be advantageous.

Figure 3:
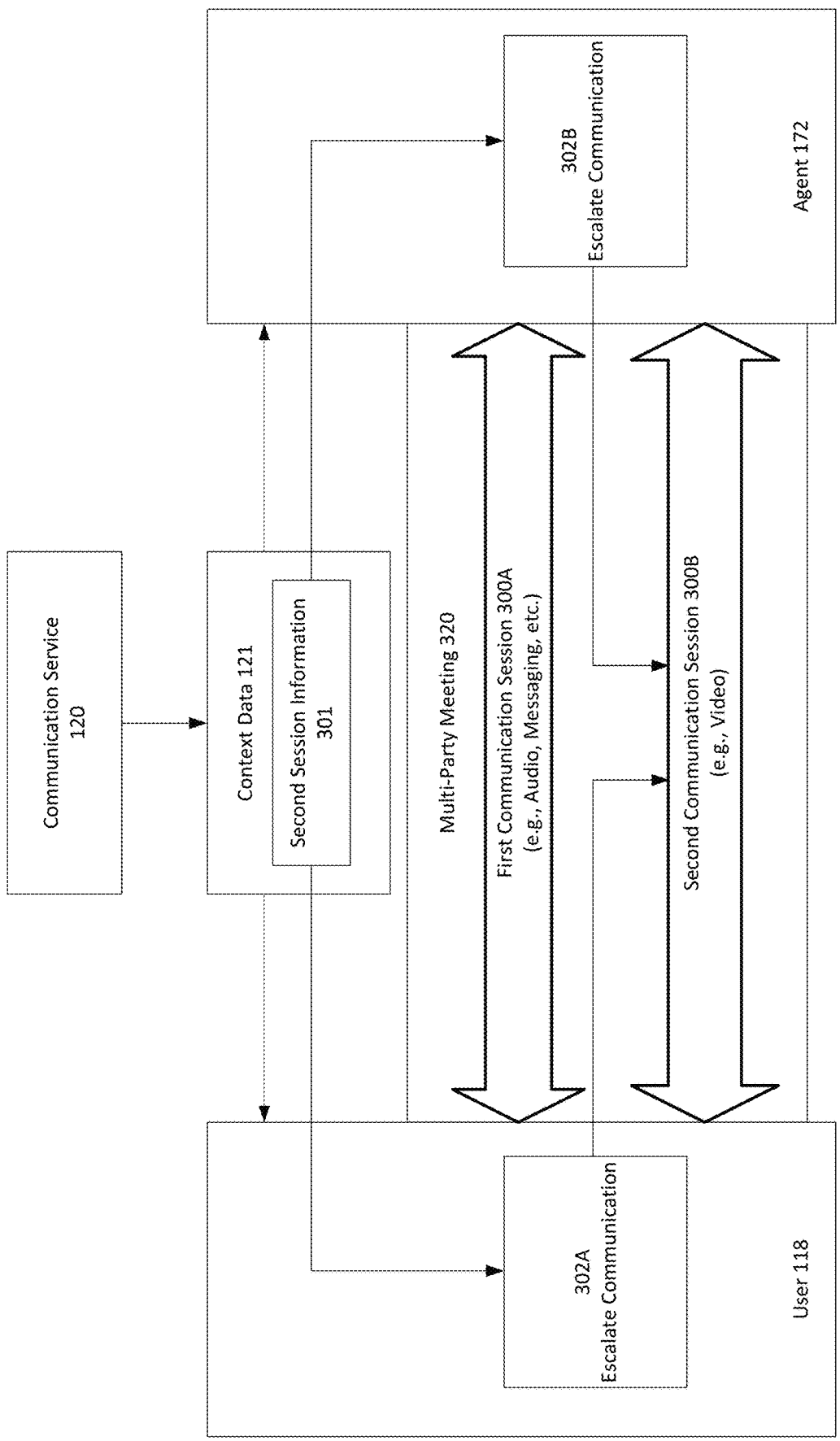
FIG. 3 is a diagram illustrating an example communication escalation system that may be used in accordance with the present disclosure.

In some examples (e.g., such as when checkbox 210 is selected), the communication service 120 may provide, within the context data 121 for communication session 100, second session information for launching a second communication session between the user 118 and the agent 172 (and/or another user on behalf of customer 170). Referring now to FIG. 3, some examples techniques for escalating a first communication session 300A to a second communication session 300B will now be described in detail. In the example of FIG. 3, the context data 121 is provided to user 118 and agent 172 for a first communication session 300A. The first communication session 300A provides a first communication medium (e.g., a phone call or other audio communication, chat, etc.). The context data 121 includes second session information 301 for launching a second communication session 300B between the user 118 and the agent 172. The second communication session 300B provides a second communication medium (e.g., video communication) that is not provided by the first communication session 300A. In one specific example, the first communication session 300A may be a phone call, and the second communication session 300B may be a video communication session. Thus, in some examples, during a first communication session 300A that is a phone call, the call participants may choose to escalate the call to a second communication session 300B that includes video. In some examples, the second session information 301 may include a join link (e.g., URL), a meeting identifier (ID), and/or other similar information. As shown in FIG. 3, at some point during the first communication session 300A, the user 118 and/or the agent 172 may choose to escalate the first communication session 300A to a second communication session 300B that includes a second communication medium that is not provided by the first communication session 300A. Specifically, at act 302A, the user 118 may choose to escalate communication for the first communication session 300A to a second communication medium (e.g., video). Similarly, at act 302B, the agent 172 may choose to escalate communication for the first communication session 300A to a second communication medium (e.g., video). Acts 302A and 302B, which include communication escalation, may be performed based on the second session information 301 included within the context data 121, such as by selecting a URL or other join link that may be included in the second session information 301. In some examples, the second communication session 300B may be implemented using a real-time communication-based media protocol, such as Web Real-Time Communication (WebRTC) protocol. The second communication session 300B may provide a variety of content sharing features, such as screen sharing, to assist in communication between the user 118 and the agent 172. In some examples, this may allow the agent 172 to further assist the user 118 in online or other activities, such as filling out an online tax or insurance form and many other types of activities. The communication escalation techniques therefore allow the user 118 and the agent 172 (and/or other users on behalf of customer 170) to participate in a multi-party meeting 320 that includes the first communication session 300A and the second communication session 300B. For example, for scenarios in which first communication session 300A is a phone call and second communication session 300B is a video session, the multi-party meeting 320 may include user device's audio session, the agent's audio, and video content (e.g., screen share, etc.) coming from the user 118 and/or the agent 172. It is noted that the user 118 may optionally join the second communication session 300B from a variety of different computing devices, including devices other than the user device 110 that the user 118 uses to initiate the communication session 100. This may be advantageous for scenarios in which the user 118 initiates the first communication session 300A from a user device 110 that does not have a connected video display, camera, and/or other video-related features.

The second session information 301 may be provided to the user 118 and the agent 172 in a variety of ways. In some examples, the second session information 301 may be included in a header a communications protocol used to implement the first communication session 300A, such as an SIP header. Also, in some examples, the second session information may be texted to a telephone number associated with the user 118 and/or the agent 172. Additionally, in some examples, the second session information 301 may be encoded into an audio stream that may be delivered to the user and/or the agent via the first communication session 300A. For example, in some cases, the second session information 301 may be encoded by being mapped to audio-frequency data that is inserted into the first communication session 300A by communication service 120, such as different sound characteristics (e.g., amplitude, duration) at various frequencies that are used to represent the second session information 301. This may allow the second session information 301 to be delivered via traditional audio calling platforms that are not SIP-based or Internet-based. Additionally, in some examples, the second session information 301 may be encrypted (e.g., via a public/private key encryption scheme) with end-to-end encryption between the user 118 and agent 172 (and/or other users on behalf of the customer 170), ensuring that nobody other than the user 118 or the agent 172 (and/or other users on behalf of the customer 170) can join the second communication session 300B and present content.

Figure 4:
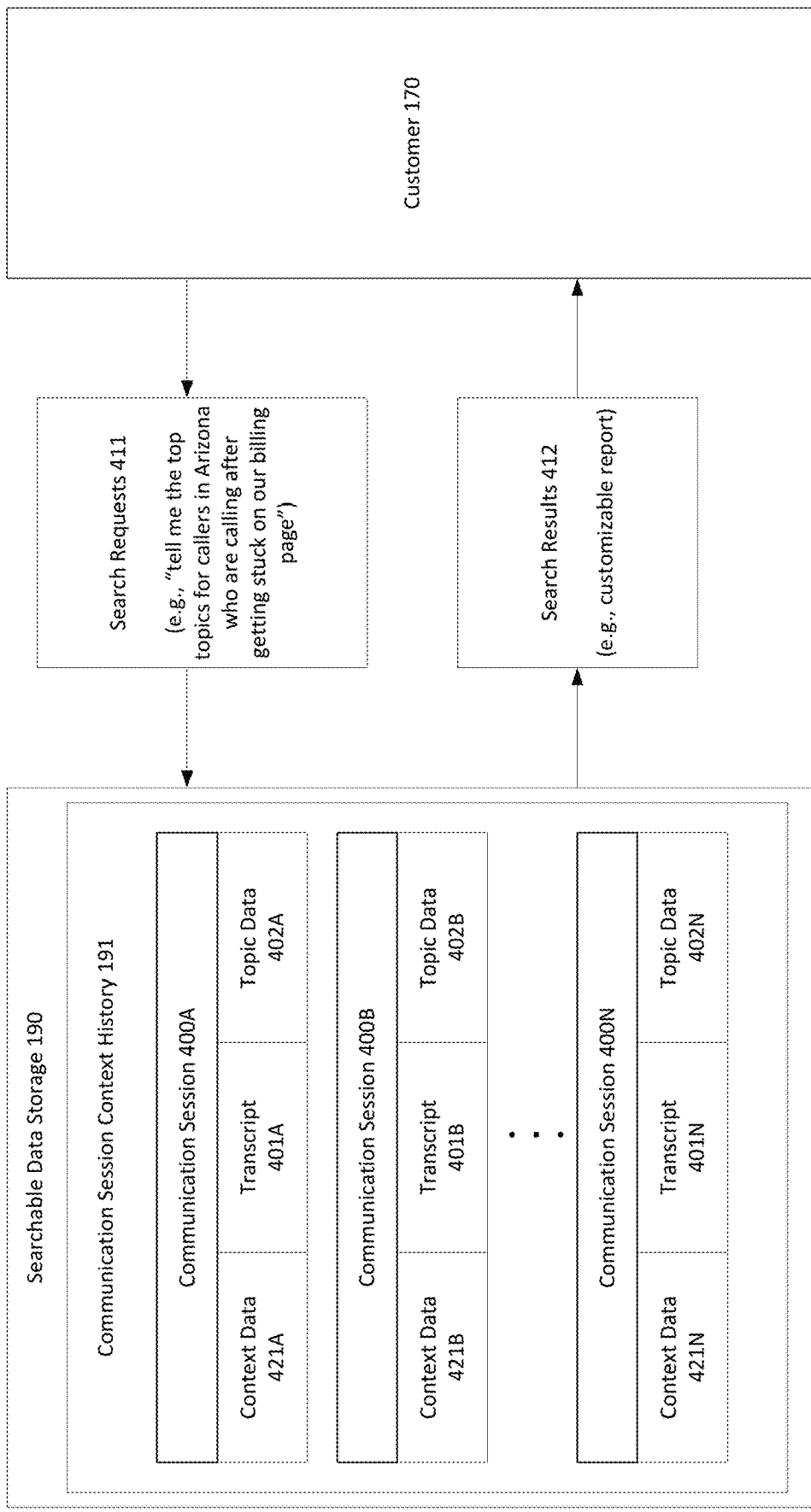
FIG. 4 is a diagram illustrating an example communication session context history searching system that may be used in accordance with the present disclosure.

Referring back to FIG. 1, it is shown, at act 134, that the communication service 120 may save the context data 121 to a communication session context history 191 within a searchable data storage 190. The communication session context history 191 may include a history of communication sessions (including communication session 100) that are associated with the customer 170. The communication service 120 may create and maintain other respective communication session context histories for other respective customers. In some examples, only customer 170 (and not other customers) may be granted access to communication session context history 191. Referring now to FIG. 4, some example aspects of communication session context history 191 will now be described in detail. In the example of FIG. 4, communication session context history 191 is associated with communication sessions 400A-N. Specifically, the communication session context history 191 includes context data 421A-N, transcripts 401A-N and topic data 402A-N, respectively, for each of communication sessions 400A-N. In one specific example, communication session 400A of FIG. 4 may be communication session 100 of FIG. 1 and context data 421A of FIG. 4 may be context data 121 of FIG. 1. In some examples, communication sessions 400A-N may include any, or all, communication sessions in which the customer 170 participates over a given time period. In some cases, the communication service 120 may generate transcripts 401A-N for each of communication sessions 400A-N. Furthermore, the communication service 120 may also determine topic data 402A-N for each of communication sessions 400A-N. In some examples, the topic data 402A-N may be generated based on the transcripts 401A-N and/or the context data 421A-N. For example, the topic data 402A-N may include keywords that are included within the transcripts 401A-N. For example, the communication service 120 may generate a list of keywords that corresponds to respective common topics for communication sessions of its customers. The communication service 120 may then analyze and parse the transcripts 401A-N to determine the topic data 402A-N. In some examples, a different respective list of keywords may be used for each customer and may optionally be generated and/or modified based on input from the respective customer. Also, in some examples, a machine learning analysis may be employed to determine topics of communication sessions based on words that are included within a transcript and/or other characteristics (e.g., the frequency with which those words are used, etc.).

As shown in FIG. 4, the customer 170 may issue search requests 411 on the searchable data storage 190, such as to determine common problems that cause users to contact the customer 170, to determine characteristics of these problems based on context (e.g., user location, device information, page identification information, etc.), to help resolve these and other problems, and for many other reasons. In some examples, the searchable data storage 190 may be searched using natural language search techniques. For example, the search requests 411 may include a query such as, "tell me the top topics for callers in Arizona who are calling after getting stuck on our billing page." The searchable data storage 190 may then be searched to generate search results 412, such as a customizable report that is generated in response to the search requests 411. In one specific example, a customizable report may include a list of communication session topics (e.g., based on topic data 402A-N) as well indications of context data 421A-N for communication sessions that match the search query, such as any, or all, of the context data indicated in FIG. 2 or otherwise described above, as well as links to transcripts 401A-N or other information about the communication sessions 400A-N.

Figure 5:
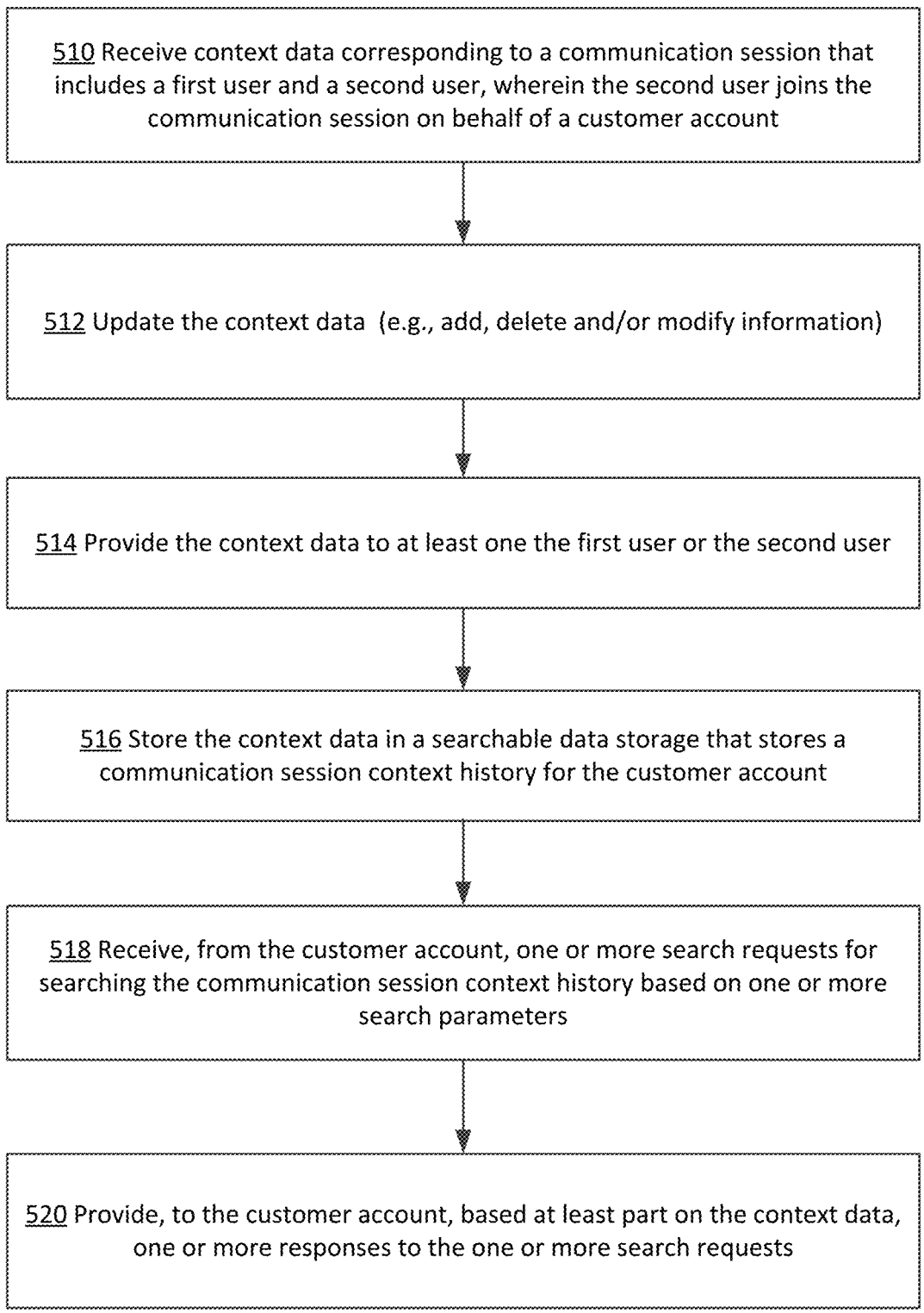
FIG. 5 is a flowchart illustrating an example communication session context data attachment and searching process that may be used in accordance with the present disclosure.

FIG. 5 is a flowchart illustrating an example communication session context data attachment and searching process that may be used in accordance with the present disclosure. In some examples, any, or all, of operations 510-520 of FIG. 5 may be performed by communication service 120 of FIG. 1. At operation 510, context data is received corresponding to a communication session that includes a first user and a second user, wherein the second user joins the communication session on behalf of a customer account. In some examples, the communication session may include at least one of audio communication (e.g., a phone call) or messaging (e.g., chat messaging). Also, in some examples, the communication session may include video communication. In some examples, the first user may be a human user. In some examples, the second user may also be a human user, such as a call center agent. In some other examples, the second user may be a bot operated by, or on behalf of, the customer. In addition to the first user and the second user, the communication session may optionally include other users, such as one or more other users that join the communication session on behalf of the customer. The communication session may be requested and initiated by the first user from within a customer user interface (e.g., voice-controlled application, client visual application, webpage, etc.) associated with the customer account. As described above with respect to FIG. 1 (e.g., at act 131 of FIG. 1), context data 121 may be received by the communication service 120 from the user device 110. For example, the customer UI 111 may collect and provide the context data 121 to the communication service 120. As also described above, a customer UI 111 may collect context data 121 corresponding to a request for a communication session 100 that is initiated from within the customer UI 111. In some examples, the context data 121 may be collected and updated by the customer UI 111 at fixed time intervals and/or in response to various actions (e.g., loading a new page, receipt of user input data, in response to the user 118 requesting a call, etc.). As also described above, in some examples, the context data 121 may include user communications (e.g., chat messages) with a bot that may be operated by, or on behalf of, the customer 170. Thus, it is noted that the context data 121 may be collected by the customer UI 111 and/or a variety of other components, including bots and other data gathering tools.

In some examples, the context data may include user activity information corresponding to user activity associated with the first user that precedes a request to initiate the communication session. For example, the user activity information may include at least one of a screenshot of a page of a customer user interface, an identifier of the page, information input to the page, or voice input issued to a user device. As described above with reference to FIG. 1, the user activity information may include information regarding user activity within the customer UI 111 prior to requesting of the communication session 100. For example, the user activity information may include an indication (e.g., screenshot, uniform resource locator (URL) or other page identifier, etc.) of a page that the user 118 is currently viewing, indications of one or more prior pages that were previously displayed to the user 118, indications of information entered by the user 118 into the current and/or prior displayed pages, indications of one or more of the most recent voice commands and/or other voice input provided by the user 118, indications of user communications (e.g., chat messages) with a bot, and the like.

Additionally, the context data may include at least one of location information for the first user, identity information for the first user, device information regarding a user device, or time information for the communication session. As described above with reference to FIG. 1, the context data 121 may include the date and time at which the communication session 100 is requested, a called telephone number or address, as well as location information for the user 118, such as based on global positioning system (GPS) coordinates of the user device 110. Furthermore, in some examples, the context data 121 may include identity information for the user 118, such as may be obtained from a user account to which the user may log-in to and be authenticated when accessing the customer UI 111. This identity information may include the user's username, age, and other information. In some examples, the user identity information and/or other portions of context data 121 may be included only to subject to user approval. The context data 121 may also include device information regarding a user device used to initiate the communication session, such as an operating system, architecture, and other information about the device. The context data 121 may also include photographs, such as the most recent photographs captured by the user device 110 or other photographs that may be attached, or otherwise indicated, by the user 118. The context data 121 may also include a wide variety of custom information (e.g., information about products in a virtual shopping cart, etc.), such as may be defined and requested by the customer 170 and/or the user 118. In some examples, the communication service 120 may provide an interface (e.g., context data selection interface 200 of FIG. 2) that allows at least one of the customer account or the first user to select context data types that are included in the context data. Some example features of context data selection interface 200 are described in detail above with reference to FIG. 2, and these details are not repeated here.

At operation 512, the context data is updated, such as by adding information to the context data, deleting information from the context data, or otherwise modifying the context data. As described above with reference to FIG. 1, at act 132, the communication service 120 may update the context data 121, such as by optionally adding additional information to the context data 121, removing information from the context data 121, or otherwise modifying the context data 121. For example, for scenarios in which communication escalation is enabled, the communication service 120 may add second session information 301 (e.g., a video join link) into the context data 121. In other examples, the communication service 120 may remove information from the context data 121, such as information that user 118 and/or customer 170 does not wish to have included in the context data 121 (e.g., based on information entered into context data selection interface 200 that is described in detail below with reference to FIG. 2).

At operation 514, the communication service 120 provides the context data 121 to at least one of the first user or the second user. For example, as described above with reference to FIG. 1, at act 133A, the communication service 120 may provide the context data 121 to the user device 110 (and/or optionally other devices operated by the user 118). Additionally, at act 133B, the communication service 120 may provide the context data 121 to the customer 170. In some examples, the context data 121 may be provided from the communication service 120 to the second user (e.g., agent 172) indirectly via one or more intermediate components, such as routing engine 174. Also, in some examples, the context data 121 may be provided to the first user (e.g., user 118) and the second user (e.g., agent 172) via a header of a communications protocol used to implement the communication session 100, such as an SIP header.

At operation 516, the context data is stored in a searchable data storage that stores a communication session context history for the customer account. For example, as described above with reference to FIG. 1, at act 134, the communication service 120 may save the context data 121 to a communication session context history 191 within a searchable data storage 190. The communication session context history 191 may include a history of communication sessions (including communication session 100) that are associated with the customer 170. The communication service 120 may create and maintain other respective communication session context histories for other respective customers. In some examples, only customer 170 (and not other customers) may be granted access to communication session context history 191.

In some examples, the communication service 120 may store a transcript of the communication session in in association with the context data. Also, in some examples, the communication service 120 may determine, based at least in part on at least one of the transcript or the context data, topic data corresponding to the communication session. The communication service may store the topic data in association with the context data. For example, as described above with reference to FIG. 4, communication session context history 191 is associated with communication sessions 400A-N. Specifically, the communication session context history 191 includes context data 421A-N, transcripts 401A-N and topic data 402A-N, respectively, for each of communication sessions 400A-N. In some examples, communication sessions 400A-N may include any, or all, communication sessions in which the customer 170 participates over a given time period. In some cases, the communication service 120 may generate transcripts 401A-N for each of communication sessions 400A-N. Furthermore, the communication service 120 may also determine topic data 402A-N for each of communication sessions 400A-N. In some examples, the topic data 402A-N may be generated based on the transcripts 401A-N and/or the context data 421A-N. For example, the topic data 402A-N may include keywords that are included within the transcripts 401A-N. For example, the communication service 120 may generate a list of keywords that corresponds to respective common topics for phone calls to its customers. The communication service 120 may then analyze and parse the transcripts 401A-N to determine the topic data 402A-N.

At operation 518, one or more search requests for searching the communication session context history based on one or more search parameters are received from the customer account. For example, as described above with reference to FIG. 4, the customer 170 may issue search requests 411 on the searchable data storage 190, such as to determine common problems that cause users to contact the customer 170, to determine characteristics of these problems based on context (e.g., user location, user device information, page identification information, etc.), to help resolve these and problems, and for many other reasons. Thus, the search parameters may include example characteristics of the context information, such as specific user locations when requesting a communication session, specific user device types, specific pages displayed to a user when a user requests a communication session, specific commands or other input entered by a user prior to requesting a communication session, and the like. In some examples, the searchable data storage 190 may be searchable using natural language search features. For example, the search requests 411 may include a query such as, "tell me the top topics for callers in Arizona who are calling after getting stuck on our billing page."

At operation 520, one or more responses to the one or more search requests may be provided, to the customer account, based at least part on the context data. For example, as described above with reference to FIG. 4, the searchable data storage 190 may be searched to generate search results 412, such as a customizable report that is generated in response to the search requests 411. In one specific example, a customizable report may include a list of communication session topics (e.g., based on topic data 402A-N) as well indications of context data 421A-N for communication session that match the search query, such as any, or all, of the context data indicated in FIG. 2 or otherwise described above, as well as links to transcripts 401A-N or other information about the communication sessions 400A-N. As a specific example, search results 412 may be provided in response to a query such as, "tell me the top topics for callers in Arizona who are calling after getting stuck on our billing page." The search results 412 may include all, or any portion of, the context data for each of the calls issued by callers in Arizona that have gotten stuck on the customer's billing page. Also, in some examples, the context data may be used to assist in determining calls that match the query. For example, user location information and page identification (e.g., page URL) and/or page screenshot information that is stored in the context data may be used to determine calls issued by callers in Arizona that have gotten stuck on the customer's billing page.

FIG. 6 is a flowchart illustrating an example communication escalation process that may be used in accordance with the present disclosure. In some examples, any, or all, of operations 610-616 of FIG. 6 may be performed by communication service 120 of FIG. 1. At operation 610, first session information is received associated with establishing a first communication session that includes a first user and a second user, wherein the second user joins the first communication session on behalf of a customer account of the communication service. The first communication session provides a first communication medium, such as audio communication or messaging (e.g., chat messaging). Thus, in some examples, the first communication session may be a phone call or a chat session. In some examples, the first user may be a human user. In some examples, the second user may also be a human user, such as a call center agent. In some other examples, the second user may be a bot operated by, or on behalf, of the customer. In addition to the first user and the second user, the first communication session may optionally include other users, such as one or more other users that join the first communication session on behalf of the customer. As described above, in some examples, the first communication session may be requested and initiated by the first user from within a customer UI 111 (e.g., voice-controlled application, client visual application, webpage, etc.) associated with the customer account. The first session information may include, for example, a called phone number and/or a messaging address to which messages are delivered. In some examples, the first communication session may be established by the communication service 120. For example, the communication service may route the first communication session from the user device 110 to the customer 170. For example, a first leg of the first communication session may be placed from the user device 110 to the communication service 120, and a second leg of the first communication session may be placed from the communication service 120 to the customer 170. Thus, in some examples, the first session information associated with establishing the first communication session that is received at operation 610 may include receiving, by the communication service 120, a first leg of the first communication session. Also, in some examples, the information associated with establishing the first communication session that is received at operation 610 may include receiving a request to initiate and/or route the first communication session, such as including a phone number and/or other address to which the user first user is requesting the first communication session to be routed.

At operation 612, second session information for joining a second communication session is provided, via the first communication session, to at least one of the first user or the second user. The second communication session provides a second communication medium (e.g., video communication) that is not provided by the first communication session. In one specific example, the first communication session may be a phone call, and the second communication session may be a video communication session. Thus, in some examples, during a first communication session that is a phone call, the call participants may choose to escalate the call to a second communication session that includes video. The second session information for joining the second communication session may be provided via the first communication session, such as via a header of a communications protocol used to implement the first communication session, by being encoded into an audio stream of the first communication session, or otherwise being provided via the first communication session. In some examples, the second session information may be provided via a header of a communications protocol used to implement the first communication session (e.g., SIP protocol). Also, in some examples, the second session information may be encoded into an audio stream of the first communication session. For example, the second session information may be encoded into the audio stream of the first communication session based on mapping of the second session information to audio frequency data. The second session information may include at least one of an identifier for the second communication session or a link (e.g., URL) that is selectable to join the second communication session. In some examples, the second session information may be encrypted, and the second session information may be decryptable only by the first user and a customer to which the first communication session is placed (e.g., customer 170 of communication service 120). The second communication session may include the first user and the second user and/or other users that join the second communication service on behalf of the customer. In some examples, the second communication session may include one or more users (e.g., users on behalf of the customer) that are not included in the first communication session. Likewise, in some examples, the first communication session may include one or more users (e.g., users on behalf of the customer) that are not included in the second communication session.

As described above with reference to FIG. 3, the context data 121 that is provided to user 118 and customer 170 may include second session information 301 for launching a second communication session that includes the user 118 and the agent 172 (and/or other users on behalf of the customer). In some examples, the second session information 301 may include a join link (e.g., URL), a meeting identifier (ID), and/or other similar information. The second session information 301 may be provided to the user 118 and the agent 172 (and/or other users on behalf of the customer) in a variety of ways. In some examples, the second session information 301 may be included in a header a communications protocol used to implement the first communication session 300A, such as an SIP header. Also, in some examples, the second session information may be texted to a telephone number associated with the user 118 and/or the agent 172. Additionally, in some examples, the second session information 301 may be encoded into the audio stream that is delivered to the user 118 and/or the agent 172 via first communication session 300A. For example, in some cases, the second session information 301 may be encoded by being mapped to audio-frequency data that is inserted into the first communication session 300A by communication service 120, such as different sound characteristics (e.g., amplitude, duration) at various frequencies that are used to represent the second session information 301. This may allow the second session information 301 to be delivered via traditional audio calling platforms that are not SIP-based or Internet-based. Additionally, in some examples, the second session information 301 may be encrypted (e.g., via a public/private key encryption scheme) with end-to-end encryption between the user 118 and agent 172 (and/or other users on behalf of the customer 170), ensuring that nobody other than the user 118 or the agent 172 (and/or other users on behalf of the customer 170) can join the second communication session 300B and present content.

At operation 614, one or more requests to join the second communication session are received based on the second session information. As described above with reference to FIG. 3, at some point during the first communication session 300A, the user 118 and/or the agent 172 (and/or another user on behalf of the customer 170) may choose to escalate the first communication session 300A to a second communication session 300B that includes a second communication medium that is not provided by the first communication session 300A. Specifically, at act 302A, the user 118 may choose to escalate the first communication session 300A to the second communication medium (e.g., video). Similarly, at act 302B, the agent 172 may choose to escalate the first communication session 300A to the second communication medium (e.g., video). Acts 302A and 302B, which include communication escalation, may be performed based on the second session information 301 included within the context data 121, such as by selecting a URL or other join link that may be included in the second session information 301.

At operation 616, the second communication session is established. The second communication session may include the first user and the second user (and/or another user that joins the second communication session on behalf of the customer). In some examples, the communication service 120 may host the second communication session. Selection of a link (e.g., URL) for the second communication session may cause the user 118 and or/the agent 172 (and/or another user that joins the second communication session 300B on behalf of the customer) to connect to the communication service 120. The communication service 120 may then receive video from, and provide video to, the user 118 and the agent 172 (and/or another user that joins the second communication session on behalf of the customer) via the connections that are established by selection of the link. As described above, in some examples, the second communication session 300B may be implemented using a real-time communication-based media protocol, such as Web Real-Time Communication (WebRTC) protocol. The second communication session 300B may provide content sharing capabilities, such as screen sharing, to assist in communication between the user 118 and the agent 172 (and/or another user that joins the second communication session 300B on behalf of the customer). In some examples, this may allow the agent 172 to further assist the user 118 in online or other activities, such as filling out an online tax or insurance form and many other types of activities. The communication escalation techniques therefore allow the user 118 and the agent 172 (and/or another user that joins the second communication session 300B on behalf of the customer) to participate in a multi-party meeting 320 that includes first communication session 300A and the second communication session 300B. For example, for scenarios in which first communication session 300A is a phone call and second communication session 300B is a video session, the multi-party meeting 320 may include the user device's audio session, the agent's audio, and video content (e.g., screen share, etc.) coming from the user 118 and/or the agent 172. It is noted that the user 118 may optionally join the second communication session 300B from a variety of different computing devices, including devices other than the user device 110 that the user 118 uses to initiate the first communication session 300A. This may be advantageous for scenarios in which the user 118 initiates the first communication session 300A from a user device 110 that does not have a connected video display, camera, and/or other video-related features.

Figure 7:
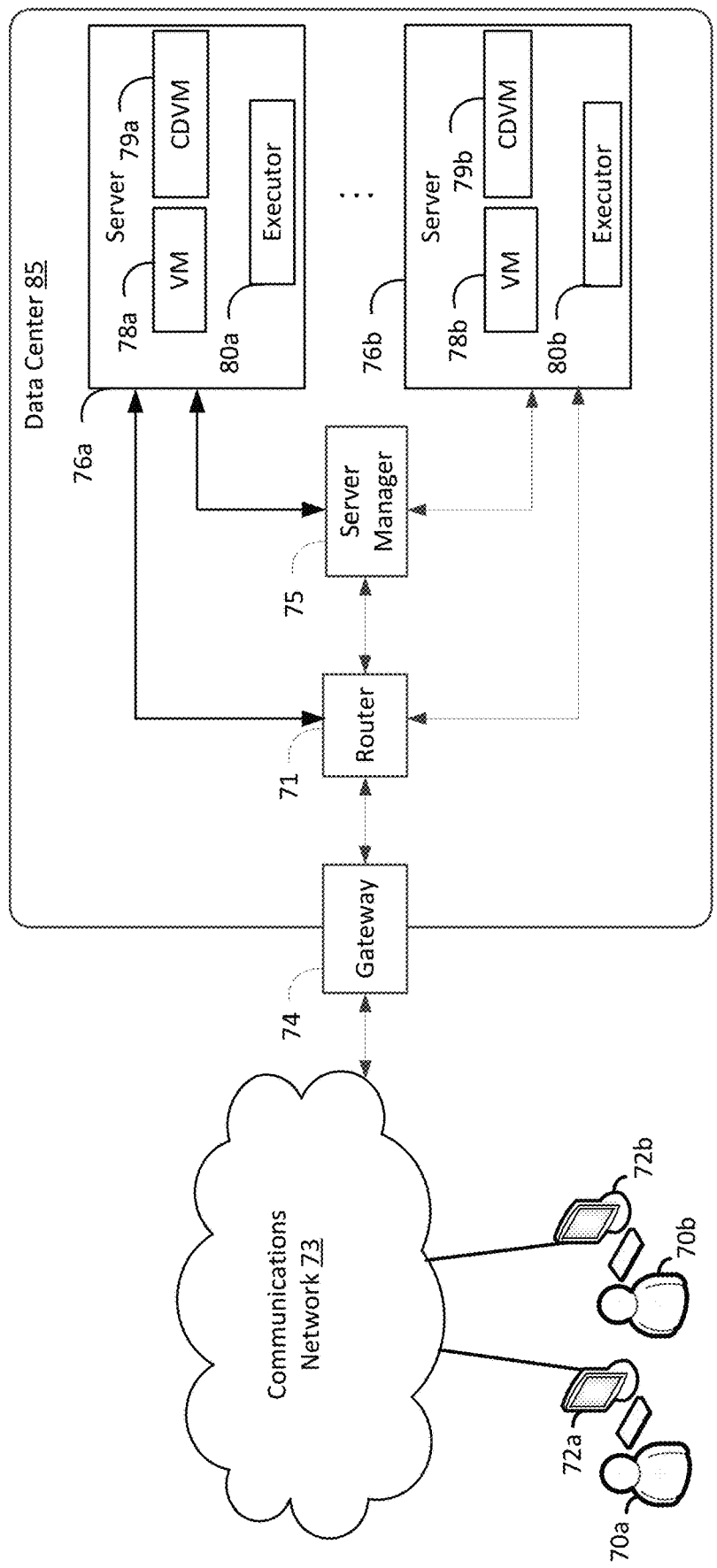
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include context data virtual machines (GSMVM's) 79a-b, which are virtual machines that are configured to execute any, or all, of the techniques associated with context data attachment to communication sessions described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
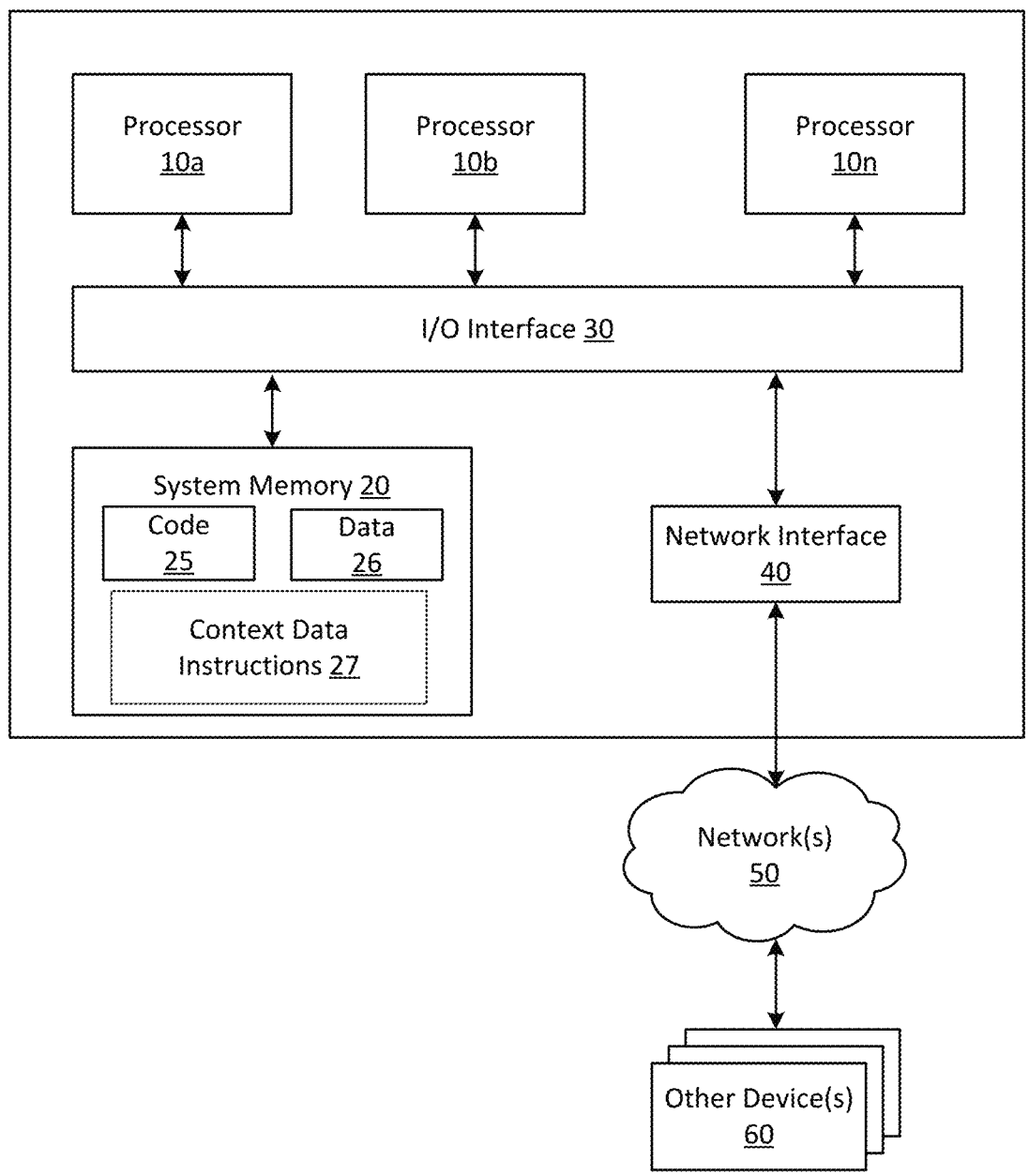
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes context data instructions 27, which are instructions for executing any, or all, of the techniques associated with context data attachment to communication sessions described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SAN (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a conveying medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform computing operations comprising:
receiving context data corresponding to a communication session that includes a first user and a second user, wherein the communication session is initiated by the first user from within a customer user interface associated with a customer account;
providing the context data to at least one of the first user or the second user;
storing the context data in a searchable data storage that stores a communication session context history for the customer account;
receive, from the customer account, one or more search requests for searching the communication session context history based on one or more search parameters; and
providing, to the customer account, based at least part on the context data, one or more responses to the one or more search requests.

2. The computing system of claim 1, wherein the context data is provided via a header of a communications protocol used to implement the communication session.

3. The computing system of claim 1, wherein the context data comprises at least one of a screenshot of a page of the customer user interface, an identifier of the page, information input to the page, or voice input issued to a user device.

4. The computing system of claim 1, wherein the communication session includes at least one of audio communication, video communication, or messaging.

5. A computer-implemented method comprising:
receiving context data corresponding to a communication session that includes a first user and a second user, wherein the communication session is initiated by the first user from within a customer user interface associated with a customer account;
storing the context data in a searchable data storage that stores a communication session context history for the customer account;
receive, from the customer account, one or more search requests for searching the communication session context history based on one or more search parameters; and
providing, to the customer account, based at least part on the context data, one or more responses to the one or more search requests.

6. The computer-implemented method of claim 5, further comprising providing the context data to at least one of the first user or the second user.

7. The computer-implemented method of claim 6, wherein the context data is provided via a header of a communications protocol used to implement the communication session.

8. The computer-implemented method of claim 5, wherein the context data comprises user activity information corresponding to user activity associated with the first user that precedes a request to initiate the communication session.

9. The computer-implemented method of claim 8, wherein the user activity information comprises at least one of a screenshot of a page of the customer user interface, an identifier of the page, information input to the page, or voice input issued to a user device.

10. The computer-implemented method of claim 5, wherein the communication session includes at least one of audio communication, video communication, or messaging.

11. The computer-implemented method of claim 5, further comprising providing an interface that allows at least one of the customer account or the first user to select context data types that are included in the context data.

12. The computer-implemented method of claim 5, further comprising storing a transcript of the communication session in association with the context data.

13. The computer-implemented method of claim 12, further comprising:
  determining, based at least in part on at least one of the transcript or the context data, topic data corresponding to the communication session; and
  storing the topic data in association with the context data.

14. The computer-implemented method of claim 5, wherein the searchable data storage is searchable using natural language search features.

15. One or more non-transitory computer-readable storage media having stored thereon computing instructions that, upon execution by one or more computing devices, cause the one or more computing devices to perform computing operations comprising:
  receiving context data corresponding to a communication session that includes a first user and a second user, wherein the context data comprises user activity information corresponding to user activity associated with the first user that precedes a request to initiate the communication session;
  storing the context data in a searchable data storage that stores a communication session context history for a customer account;
  receive, from the customer account, one or more search requests for searching the communication session context history based on one or more search parameters; and
  providing, to the customer account, based at least part on the context data, one or more responses to the one or more search requests.

16. The one or more non-transitory computer-readable storage media of claim 15, wherein the context data comprises at least one of location information for the first user, identity information for the first user, device information regarding a user device, or time information for the communication session.

17. The one or more non-transitory computer-readable storage media of claim 15, wherein the operations further comprise providing an interface that allows at least one of the customer account or the first user to select context data types that are included in the context data.

18. The one or more non-transitory computer-readable storage media of claim 15, wherein the communication session includes at least one of audio communication, video communication, or messaging.

19. The one or more non-transitory computer-readable storage media of claim 15, wherein the communication session is routed to the second user based at least in part on the context data.

20. The one or more non-transitory computer-readable storage media of claim 15, wherein the user activity information comprises at least one of a screenshot of a page of a customer user interface, an identifier of the page, information input to the page, or voice input issued to a user device.

* * * * *